United States Patent [19]

Matsui et al.

[11] Patent Number: 5,246,758
[45] Date of Patent: Sep. 21, 1993

[54] OPTICAL RECORDING MEDIUM

[75] Inventors: Fumio Matsui; Fumihiko Yokogawa, both of Saitama, Japan

[73] Assignee: Pioneer Electronic Corporation, Tokyo, Japan

[21] Appl. No.: 862,373

[22] Filed: Apr. 2, 1992

[30] Foreign Application Priority Data

Jul. 3, 1991 [JP] Japan .................................. 3-162791

[51] Int. Cl.[5] ............................................. B32B 3/00
[52] U.S. Cl. ........................................ 428/64; 428/65; 428/457; 428/913; 430/945; 346/76 L; 346/135.1
[58] Field of Search ................... 428/64, 65, 457, 913; 430/945; 346/76 L, 135.1

[56] References Cited

U.S. PATENT DOCUMENTS 5,061,582 10/1991 Buettle et al. .......................... 430/19
5,088,086 2/1992 Van et al. .............................. 369/100

Primary Examiner—Patrick J. Ryan
Assistant Examiner—E. Evans
Attorney, Agent, or Firm—Sughrue, Mion, Zinn, Macpeak & Seas

[57] ABSTRACT

An optical recording medium, including a substrate and a recording film disposed thereon, wherein an optical shutter layer is disposed in front of the recording film with respect to the direction of an incident reading light beam or recording light beam which is to be supplied to the optical recording medium; and the optical shutter layer comprises, as a main component, a substance having a shutter property such that the substance is in a state where it develops a color thereof until the substance is irradiated with a reading light beam, but when the substance is irradiated with the reading light beam, the substance irradiated with the reading light beam is heated up over a certain temperature so that the substance is decolored and a central portion of the optical shutter layer irradiated with the reading light beam is caused to have a light transmission.

13 Claims, 3 Drawing Sheets

DIRECTION OF AN INCIDENT READING LIGHT BEAM
OR RECORDING LIGHT BEAM

DIRECTION OF AN INCIDENT READING LIGHT BEAM
OR RECORDING LIGHT BEAM

OPTICAL RECORDING MEDIUM

BACKGROUND OF THE INVENTION

The present invention relates to a writable optical recording medium, comprising a light transmissive substrate and a recording film disposed thereon, particularly to an optical recording medium which has been improved on recording density (or packing density) to attain high density recording.

Hitherto, with respect to a so-called writable optical recording medium, there have been attempted and proposed various structures of such an optical recording medium which are capable of effecting high density recording so that the storage capacity (or memory capacity) thereof may be improved.

For example, in the conventional optical recording medium, there have been various attempts to improve memory capacity including; (1) a method wherein the distance between adjacent pits is reduced or the distance (or pitch) between adjacent tracks is reduced; (2) a method wherein plural substances each of which is responsive to each of many stimulations such as light and electricity are used as recording substances; (3) a so-called multiple wavelength optical recording medium comprising a plurality of colored matter films sequentially laminated on a substrate; (4) a PHB (Photo Chemical Burning) as a solid memory which has attracted much attention because it is capable of producing extremely high density recording; etc.

However, there is little possibility that the methods (2) to (4) as described above will be rapidly put into practice at the current level of the technique. Therefore, the above method (1) alone is an extension of the technique, and can be put into practice.

In the above method (1), however, recording (or writing) can be effected in a state where the distance between the adjacent pits is reduced or the pitch of tracks is reduced, but reading cannot be effected in such a state by use of a spot diameter of the present reading light (light beam). More specifically, when the present spot diameter of the recording light beam is used, it is possible to form a recording pit having a diameter which is smaller than that of the above spot diameter on the basis of a relation between the peak intensity of the light and the sensitivity of the recording film. However, in order to read such a recording pit without cross talk, it is necessary to further reduce the spot diameter of the present reading light. The spot diameter (D) is represented by a formula: $D = \lambda$ (wavelength)/NA (numerical aperture or aperture ratio of the lens). In order to reduce the spot diameter (D), it is necessary to increase the NA value and to decrease the $\lambda$ value. In order to increase the NA value, it is necessary to increase the aperture half angle. In such a case, however, it is necessary to use a certain working distance between the lens and the recording medium, and it is difficult to increase the present NA value. In addition, along with the development of SHG, THG, etc., it is theoretically possible to shorten the wavelength ($\lambda$). However, such a method has not been put into practice yet.

SUMMARY OF THE INVENTION

An object of the present invention is, in view of the above problems encountered in the prior art, to provide an optical recording medium whereby the recording pit information provided by high density recording which has not been able to read in the prior art can be read as if the spot diameter were reduced by use of the present technique.

According to the present invention, there is provided an optical recording medium, comprising a substrate and a recording film disposed thereon, wherein an optical shutter layer is disposed in front of the recording film with respect to the direction of an incident reading light beam or recording light beam which is to be supplied to the optical recording medium; and the optical shutter layer comprises, as a main component, a substance having a shutter property such that the substance is in a state where it develops a color thereof until the substance is irradiated with a reading light beam, but when the substance is irradiated with the reading light beam, the substance irradiated with the reading light beam is heated above a certain temperature so that the substance is decolored and a central portion of the optical shutter layer irradiated with the recording light beam allows light transmission.

When spot irradiation with the reading light is effected on the optical recording medium according to the present invention, the central portion of the optical shutter layer provided with the spot irradiation, wherein the light energy is particularly intense, is locally heated so as to provide a local increase in temperature so as to remove (or decolor) the color of a portion having a diameter smaller than the spot diameter of the reading light. As a result, such a decolored portion selectivity transmits the reading light.

These and other objects, features and advantages of the present invention will become more apparent upon a consideration of the following description of the preferred embodiments of the present invention taken in conjunction with the accompanying drawings.

DESCRIPTION OF PREFERRED EMBODIMENT

An embodiment of the writable optical recording medium according to the present invention will be specifically described with reference to FIGS. 1 and 2.

Figure 1:
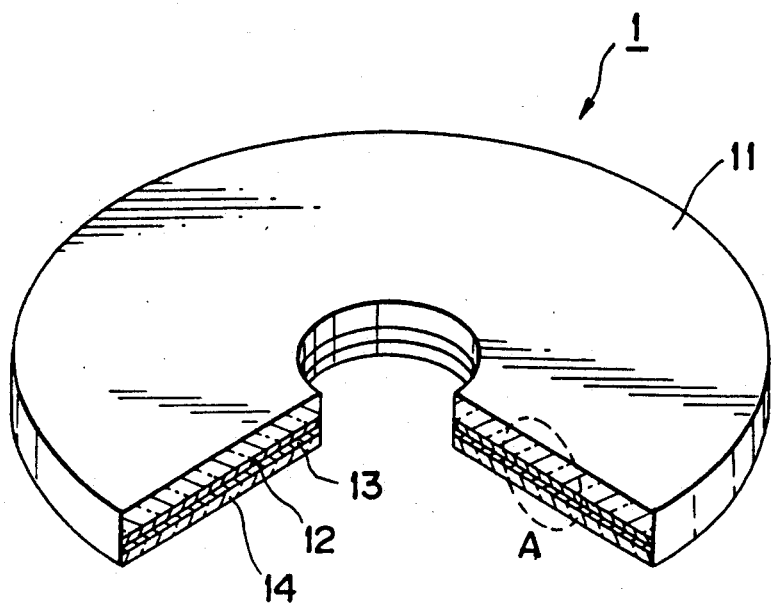
FIG. 1 is a partially cut away schematic perspective view showing an embodiment of the optical recording medium according to the present invention.
Figure 2:
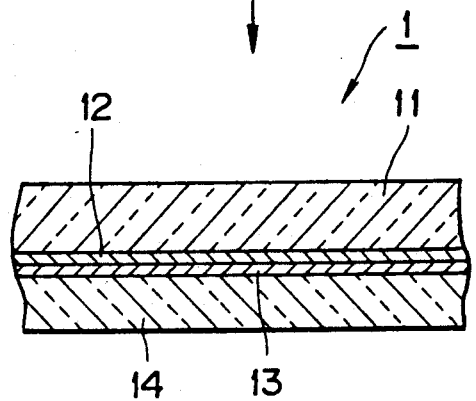
FIG. 2 is an enlarged partial sectional view of the cut away portion A of FIG. 1.

FIG. 1 is a partially cut away schematic perspective view showing an embodiment of the optical recording medium according to the present invention. FIG. 2 is an enlarged partial sectional view of the cut away portion A of FIG. 1.

The optical recording medium 1 according to the present invention comprises a substrate 11, an optical shutter layer 12 disposed on the substrate 11, a recording film 13 disposed on the optical shutter layer 12, and a light reflection (or optical reflection) layer 14 disposed on the recording film 13.

The substrate 11 is in a form of a disk-like substrate having a characteristic such that it transmitts light. In general, on a surface of the substrate 11 on which the recording film is to be formed, there is formed a groove for effecting tracking. In view of an improvement in productivity, it is preferred to use a so-called injection molded resin substrate as such a substrate 11. Such a substrate may for example be formed by use of a transparent resin such as a polycarbonate resin (PC), and a polymethylmethacrylate resin (PMMA). The substrate 11 may preferably have a thickness of about 1.0 to 1.5 mm.

On such a substrate 11, the optical shutter layer 12 is disposed. The optical shutter layer 12 comprises, as a main component, a substance having a shutter characteristic. More specifically, the above substance to be used for such a purpose is ordinarily in a state where it develops a color thereof and it does not transmit a reading light beam or a recording light beam. In addition, the color of such a substance is removed (or the substance is decolored) along with an increase in the temperature being more than a certain temperature and is converted into a state where it transmits a light beam. Accordingly, when spot irradiation with the reading light is effected on the optical shutter layer, the central portion of the optical shutter layer provided with the spot irradiation, wherein the light energy is particularly intense, is locally heated so as to provide a local increase in temperature so as to remove (or decolor) the color of a portion having a diameter smaller than the spot diameter of the reading light. As a result, such a decolored portion selectively transmits the reading light. Specific examples of the substance having such a shutter characteristic may include: spiropyran compounds, spironaphthoxazine compounds, fulgide compounds, diarylethene compounds, lactone type compounds, fluoran type, etc. The optical shutter layer 12 may also contain an appropriate binder. The optical shutter layer 12 to be formed in such a manner may preferably have a sufficient thickness such that it does not permit the transmission of the light beam. More specifically, the optical shutter layer 12 may have a thickness of about 0.02 to 1 $\mu$m.

On the above optical shutter layer 12, the recording film 13 is formed. The recording film 13 may for example comprise an organic coloring matter (or pigment) such as cyanine pigment (or dye) and phthalocyanine pigment (or dye). The recording film comprising an organic coloring matter may for example be formed by use of a known coating method such as a spin coating method. The thus formed recording film may preferably have a thickness of about 20 to 3000 nm. In the above coating operation, it is possible to use a known solvent. Specific examples thereof may include: diacetone alcohol, ethyl cellosolve, methyl cellosolve, isophorone, methanol, tetrafluoropropanol, dichloroethane, etc.

The recording film 13 may comprise one selected from various materials known in the prior art which is capable of being subjected to optical recording. Such a material may for example include Te type inorganic materials which are capable of forming a pit to effect recording. Specific examples thereof may include recording materials utilizing a phase change, such as As-Te-Ge type material, Sn-Te-Se type material, TeOx type material, $Sb_2Se_3$, $Bi_2Te_3$, etc.

On the above recording film 13, the light reflection layer 14 may be formed. The light reflection layer may comprise a metal such as Au, Ag, Cu, and Al. Such a light reflection layer may be formed by use of one selected from various vacuum film forming (or vacuum vapor deposition) processes such as vacuum evaporation, sputtering, and ion plating. The thus formed light reflection layer 14 may preferably have a thickness of about 0.02 to 2.0 $\mu$m.

Figure 3:
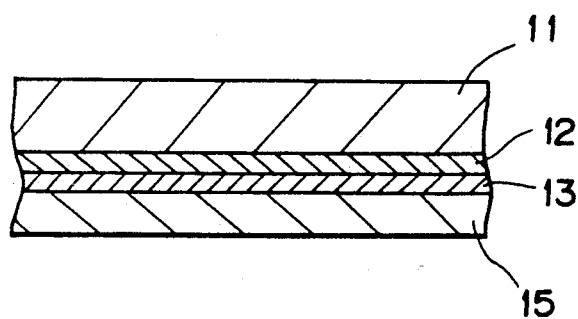
FIG. 3 is an enlarged partial sectional view showing the structure of a second embodiment of the optical recording medium according to the present invention.

In addition, as shown in FIG. 3, a protection layer 15 may be disposed in place of the light reflection layer 14. In general, the protection layer 15 may be formed by, e.g., forming a coating film of an ultraviolet ray curing (or hardening) resin by use of a spin coating method, and irradiating the resultant coating layer with ultraviolet ray to harden the coating layer. In addition, the protection layer may also be formed by use of a resin such as epoxy resin, acrylic resin, silicone resin, and urethane resin. In general, the thus formed protection layer 15 may preferably have a thickness of about 1 to 10 $\mu$m.

It is also possible to dispose an intermediate layer between the above recording film 13 and the light reflection layer 14. Such an intermediate layer has a function of improving the efficiency in the light absorption and/or the light reflection. In addition, it is also possible to adopt a so-called air sandwich structure which is capable of being subjected to dual sided recording. The optical shutter layer according to the present invention is also applicable to an ordinary medium such as CD (compact disk) and LD (laser disk) which does not have a writable recording film.

Hereinbelow, the present invention will be described in more detail with reference to specific Experiment Examples.

EXPERIMENT EXAMPLE

Preparation of Sample According to the Present Invention

There was used a polycarbonate substrate 11 for CD which had a diameter of 120 mm and a thickness of 1.2 mm wherein pre-pits as recorded information had been formed in advance. In the formation of such pits, the distance between the adjacent pits was reduced so that the resultant substrate was capable of high density recording providing a recording density which has 4 times that in the conventional recording. On such a substrate 11 (on the side thereof on which the pits had been formed), an optical shutter layer 12 was formed by use of a spin coating method.

The optical shutter layer 12 was formed by use of a mixture comprising substances represented by the following structural formulas [1] and [2] in a mixing ratio of 1:1.

Structural formula [1]:

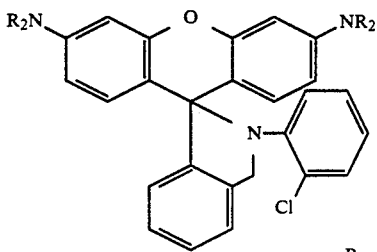

R: alkyl group, etc.

Structural formula [2]:

-continued

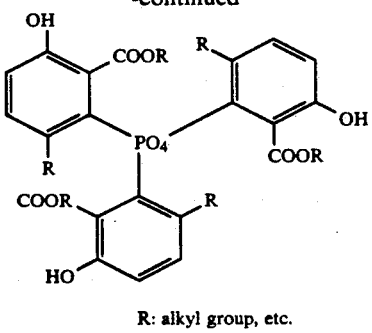

R: alkyl group, etc.

Figure 4:
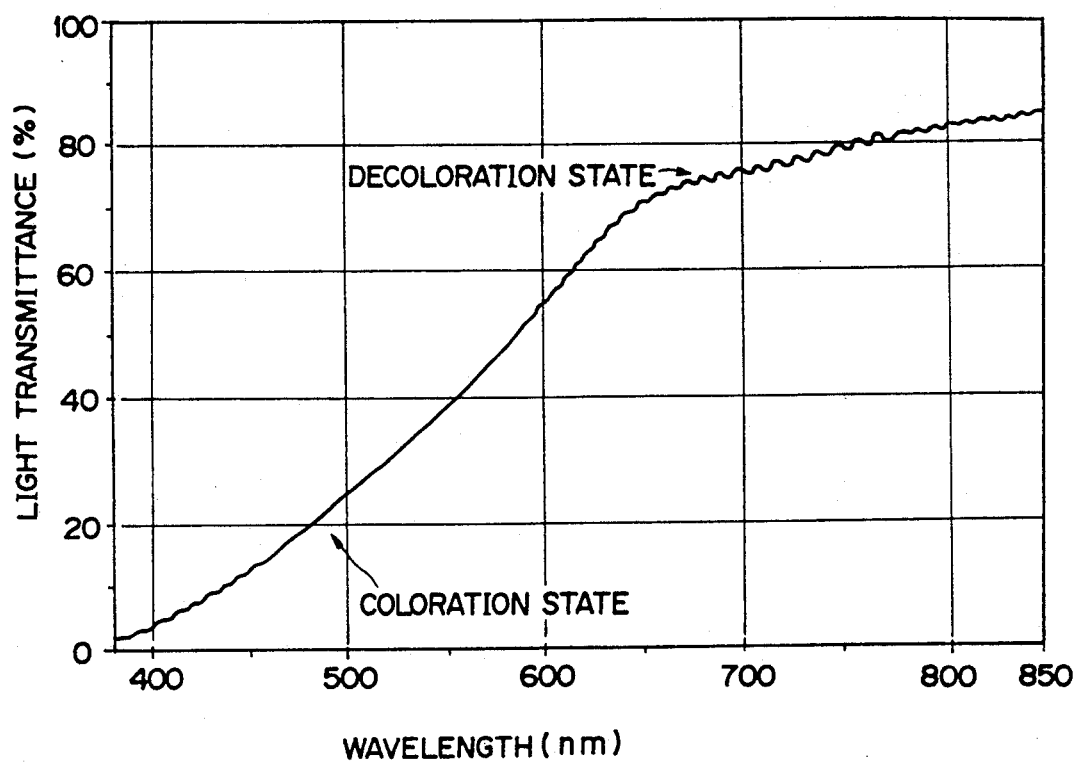
FIG. 4 is a graph showing a relationship between the wavelength and the light transmittance in the optical shutter layer used in Example of present invention.

FIG. 4 shows a relationship between the wavelength and the light transmittance in the thus formed optical shutter layer 12. As shown in FIG. 4, the optical shutter layer 12 provided a light transmittance of above 80% on the basis of the decoloration thereof with respect to a wavelength of 780 to 830 nm of a laser beam to be used in this example.

In addition, a light reflection layer comprising Au was formed on the above optical shutter layer 12 by use of a vacuum evaporation process so as to provide a thickness of 1000 Å, thereby to provide a sample of the optical recording medium according to the present invention.

Preparation of Comparative Sample

A comparative sample was prepared in the same manner as in the case of the above sample according to the present invention except that the optical shutter layer 12 was not provided.

By use of the two Samples prepared above, reproduction was effected in the same manner as in the conventional reproduction method (reproduction wavelength=780 nm, reproduction output=0.5 mW). When the Sample according to the present invention was used, it was confirmed that the reading operation could be effected without cross talk. However, when the Comparative Sample was used, it was confirmed that the reading operation could not be effected because of the occurrence of cross talk.

As described hereinabove in the optical recording medium according to the present invention, an optical shutter layer is provided in front of a recording film with respect to the direction of an incident reading light beam or recording light beam; and the optical shutter layer comprises, as a main component, a substance such that it is in a state where the substance develops a color thereof and does not transmit a light beam, until the substance is irradiate with the reading light, but a central portion of the substance irradiated with the reading light is heated up to a certain temperature and the substance is partially decolored or bleached so as to provide a light transmissivity, when irradiated with the reading light. As a result, according to the present invention, it is possible to read recorded pit information corresponding to high density recording which has not been read in the prior art.

What is claimed is:

1. An optical recording medium, comprising a substrate and a recording film disposed thereon, wherein an optical shutter layer is disposed in front of the recording film with respect to the direction of an incident reading light beam or recording light beam supplied to the optical recording medium; and wherein the optical shutter layer comprises, as a main component, a substance having a shutter property, said substance consists of at least one photo-thermochromic compound selected from the group consisting of spiropyran compounds, spironaphthoxazine compounds, fulgide compounds and diarylethene compounds, or at least one chemi-thermochromic compound selected from the group consisting of lactone compounds and fluoran compounds, said optical shutter layer having a thickness of about 0.02 to 1 μm, wherein the substance is in a state where it develops a color thereof until the substance is irradiated with a reading light beam, and when the substance is irradiated with the reading light beam, the substance irradiated with the reading light beam is heated over a certain temperature so that the substance is decolored and a central portion of the optical shutter layer irradiated with the reading light beam is caused to transmit light.

2. An optical recording medium according to claim 1, wherein a light reflection layer is formed on the recording film.

3. An optical recording medium according to claim 2, wherein said light reflection layer comprises a metal selected from the group consisting of Au, Ag, Cu and Al.

4. An optical recording medium according to claim 2, wherein said light reflection layer has a thickness of about 0.02 to 2.0 μm.

5. An optical recording medium according to claim 2, wherein an intermediate layer is disposed between said light reflection layer and said recording film.

6. An optical recording medium according to claim 1, wherein a protection layer is formed on the recording film.

7. An optical recording medium according to claim 6, wherein said protection layer comprises a resin selected from the group consisting of epoxy resins, acrylic resins, silicone resins, and urethane resins.

8. An optical recording medium according to claim 6, wherein said protection layer has a thickness of about 1 to 10 μm.

9. An optical recording medium according to claim 1, wherein said substrate is a resin selected from the group consisting of a polycarbonate resin and a polymethylmethacrylate resin.

10. An optical recording medium according to claim 1, wherein said substrate has a thickness of about 1.0 to 1.5 mm.

11. An optical recording medium according to claim 1, wherein said recording film comprises an organic coloring material selected from the group consisting of cyanine dyes and phthalocyanine dyes.

12. An optical recording medium according to claim 1, wherein said recording film has a thickness of about 20 to 3000 nm.

13. An optical recording medium according to claim 1, wherein said recording film comprises a material selected from the group consisting of As-Te-Ge materials, Sn-Te-Se materials, TeOx materials, $Sb_2$, $Se_3$, $Bi_2$, and $Te_3$.

* * * * *